United States Patent
Fung et al.

(10) Patent No.: US 6,618,215 B2
(45) Date of Patent: Sep. 9, 2003

(54) LOW AMPLITUDE SKIP WRITE DETECTOR

(75) Inventors: Kendall Hayne Fung, Longmont, CO (US); Ewe Chye Tan, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/093,203

(22) Filed: Mar. 6, 2002

(65) Prior Publication Data

US 2002/0176195 A1 Nov. 28, 2002

Related U.S. Application Data

(60) Provisional application No. 60/292,666, filed on May 22, 2001.

(51) Int. Cl.$^7$ ............................................... G11B 27/36
(52) U.S. Cl. .............................. 360/31; 360/75; 360/53; 360/77.08
(58) Field of Search ............................. 360/60, 46, 67, 360/25, 31, 69, 75, 53, 77.08, 78.14

(56) References Cited

U.S. PATENT DOCUMENTS

| | | | |
|---|---|---|---|
| 5,721,457 A | 2/1998 | Sri-Jayantha et al. | |
| 5,831,781 A | * 11/1998 | Okamura | 360/31 |
| 6,178,058 B1 | 1/2001 | Pan et al. | |

* cited by examiner

*Primary Examiner*—Alan T. Faber
(74) *Attorney, Agent, or Firm*—Merchant & Gould P.C.

(57) ABSTRACT

A method and apparatus for detecting and respond to low-amplitude-write/skip-write events in a disc drive. The invention involves characterizing the gain factor of a variable gain amplifier embedded in the read path of a disc drive during at least two instances in which the read head passes over a servo sector, prior to a write event. Next the write event is executed. After the write event, the gain factor employed by the variable gain amplifier is acquired as the read head passes over the following servo sector. Finally, the acquired gain factor is compared to the characterization in order to detect a low-amplitude-write/skip-write event.

19 Claims, 4 Drawing Sheets

LOW AMPLITUDE SKIP WRITE DETECTOR

RELATED APPLICATIONS

This application claims the benefit of the filing date of U.S. Provisional Patent Application Serial No. 60/292,666 filed May 22, 2001 and entitled "LOW AMPLITUDE SKIP WRITE DETECTOR."

FIELD OF THE INVENTION

This application relates to hard disc drives and more particularly to an apparatus and method for detecting low-amplitude-write/skip-write events.

BACKGROUND OF THE INVENTION

The storage medium for a disc drive is a flat, circular disc capable of retaining localized magnetic fields. The data that are stored upon the disc find physical representation through these localized magnetic fields. The data are arranged on the disc in concentric, circular paths known as "tracks." The localized magnetic fields can be detected by a magnetically sensitive head when they are brought in close proximity to the head.

During operation, the disc continually rotates, creating an air current that interacts with an air-bearing surface on the head, thereby causing the head to literally float at a small elevation (referred to as a "fly height") over the surface of the disc. For example, a head may float on the order of 0.35 microinches above the surface of a disc, while the disc rotates.

The elevation at which a head floats above a disc is an important variable that influences the operation of the recording and detection circuitry of a disc drive. The recording circuitry must produce a recording signal (flux field) of sufficient magnetic intensity to saturate the media and write a recoverable signal when read, given the elevation of the head (the greater the span of space between the write head and the disc, the greater the magnetic field required for saturation during writing). Similarly, the detection circuitry must amplify the signals recovered from the disc by a gain factor sufficient to permit detection, given the elevation of the head (the greater the span of space between the read head and the disc, the greater the gain factor that is required for reading).

Occasionally, a particle of matter interrupts the normal air current that causes a head to float above the disc, thus causing the head to momentarily "fly" from its normal elevation to a greater one. For example, a head that normally floats at a height of 0.35 microinches above the surface of a disc may momentarily soar to 0.70 microinches before returning to its ordinary elevation of 0.35 microinches. If such an event occurs during a period of time when the disc drive is executing a write command, the flux field from the write head cannot saturate the media, which in turn results in the signal being recorded on the disk with a reduced intensity. This phenomenon is referred to as a "low-amplitude-write," a "skip-write" event, or a "write irregularity" because while the head is soaring, it fails to record a satisfactorily strong signal upon the disc. The terms "low-amplitude write," "skip write," and "write irregularity" are used interchangeably herein. Other causes may instigate a write irregularity or a low-amplitude-write/skip-write event. For example, the disc drive, itself, may be jarred during the execution of a write command, causing the head to momentarily soar to an abnormal elevation. Broadly speaking, any event that causes a head to depart from its normal path during the course of a write operation is termed a "write irregularity."

The occurrences of low-amplitude-write/skip-write events are inimical to the goal of efficient data recording and recovery for at least two reasons. First, if the intensity of the signal recorded upon the disc is less than expected by the detection circuitry, the detection circuitry may be initially unable to read the signal. As a consequence, the disc drive will invoke several re-read algorithms in an attempt to recover the data—a costly proposition with respect to time. Secondly, if the intensity of the recorded signal is sufficiently weak, the signal may be utterly irrecoverable, regardless of the re-reading measures taken by the disc drive.

Because of the detrimental effects of low-amplitude-write/skip-write events, there exists a need to detect their occurrence. A desirable characteristic of a low-amplitude-write/skip-write event detection scheme is the requirement of no additional hardware (thus resulting in no additional manufacturing expense). Additionally, a desirable solution would consume minimal printed circuit board space, and would require minimal additional hardware debugging.

SUMMARY OF THE INVENTION

Against this backdrop the present invention has been developed. A method for detecting and responding to low-amplitude-write/skip-write events involves characterizing the gain of a variable gain amplifier embedded in the read path of a disc drive during at least two instances in which the read head passes over a servo sector, prior to a write event. Next, the write event is executed. After the write event, the gain factor employed by the variable gain amplifier is acquired as the read head passes over the following servo sector. Finally, the acquired gain factor is compared to the characterization in order to detect a low-amplitude-write/skip-write event.

According to another embodiment of the invention, a disc drive is configured and arranged to detect a low-amplitude-write/skip-write event A disc drive so configured may include a disc for magnetically storing data. A read head is used to read data from the disc. A variable gain amplifier is operably coupled to the read head; the variable gain amplifier receives a signal from the read head and outputs a signal of approximately constant amplitude. The gain of the variable gain amplifier is controlled by a control signal generated by a gain controller. Finally, a microprocessor is operably coupled to the gain controller, such that the microprocessor has access to a digital representation of the control signal. The microprocessor is programmed to carry out the steps described above.

According to yet another aspect of the invention, a disc drive may be configured and arranged to detect a low-amplitude-write/skip-write event. A disc drive so configured may include a disc for magnetically storing data and a means for detecting a low-amplitude-write/skip-write event.

DETAILED DESCRIPTION

In some forms of disc drives, several consecutive data sectors (sectors in which user data are written) are followed by a servo sector (a sector in which servo data are written for the purpose of permitting the disc drive to determine whether the head is located over the proper region of the disc). This pattern of alternating data and servo sectors is repeated along each track. During execution of a write command, the disc drive reads the data in the servo sectors to ensure that it is located over the proper location of the disc. Meanwhile, as the head becomes oriented over the data sectors, user data is written to the disc. Thus, during execution of a write command, the disc drive alternates between reading servo sectors and recording user data to the disc.

Whenever the disc drive of the present invention attempts to read data from the disc—including instances in which it is attempting to read servo data during execution of a write command—variable gain amplifier is used to receive the signal detected by the read head and amplify the signal to yield an output signal with an approximately constant amplitude. If the signal from the head is relatively weak, the variable gain amplifier must perform a relatively strong amplification operation. Conversely, if the signal is relatively strong, the amplification operation is relatively weak.

Servo sectors are written during manufacture of the disc drive, and thus are of approximate constant magnetic intensity. Consequently, any variance in the gain factor employed by the aforementioned variable gain amplifier during detection of a servo sector is the result of variance in the elevation of the head. If the gain factor employed by the variable gain amplifier during detection of a servo sector is relatively high, it is an indication that the head was at a relatively high elevation over the surface of the disc as it passed over the servo sector. Similarly, if the gain factor employed by the variable gain amplifier during detection of a servo sector is relatively low, it is an indication that the head was at a relatively low elevation over the surface of the disc as it passed over the servo sector. Thus, the gain factor employed by the variable gain amplifier during detection of a servo sector may be used as a proxy for measuring the elevation of the head as it passes over a servo sector.

Most low-amplitude-write/skip-write events that are of sufficient degree to be problematic result in the head traversing an abnormally elevated path that spans at least one servo sector. Consequently, the gain factor employed by the variable gain amplifier during detection of a servo sector can be used to detect the occurrence of a low-amplitude-write/skip-write event.

Figure 1:
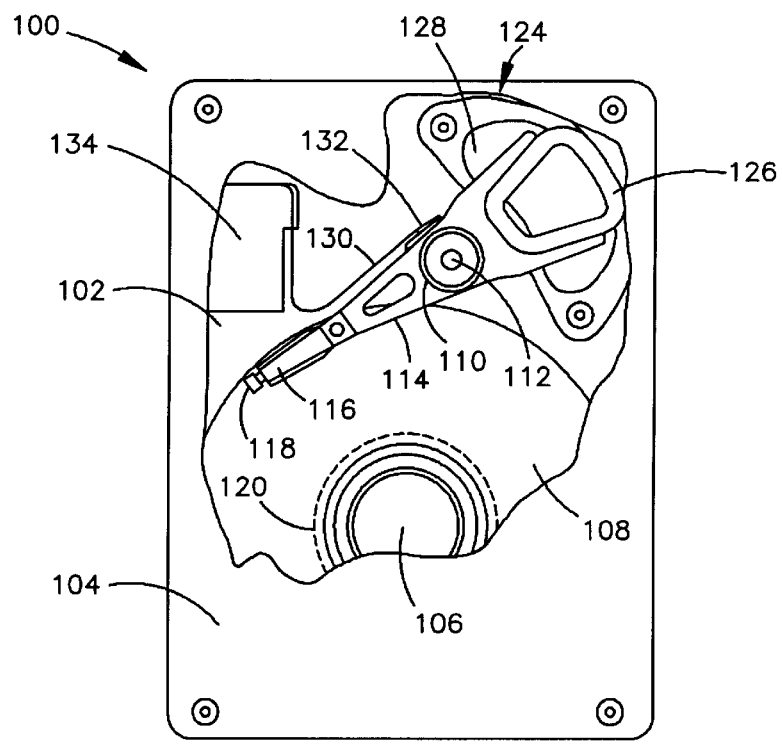
FIG. 1 is a schematic representation of a disc drive in accordance with a preferred embodiment of the invention.
Figure 2:
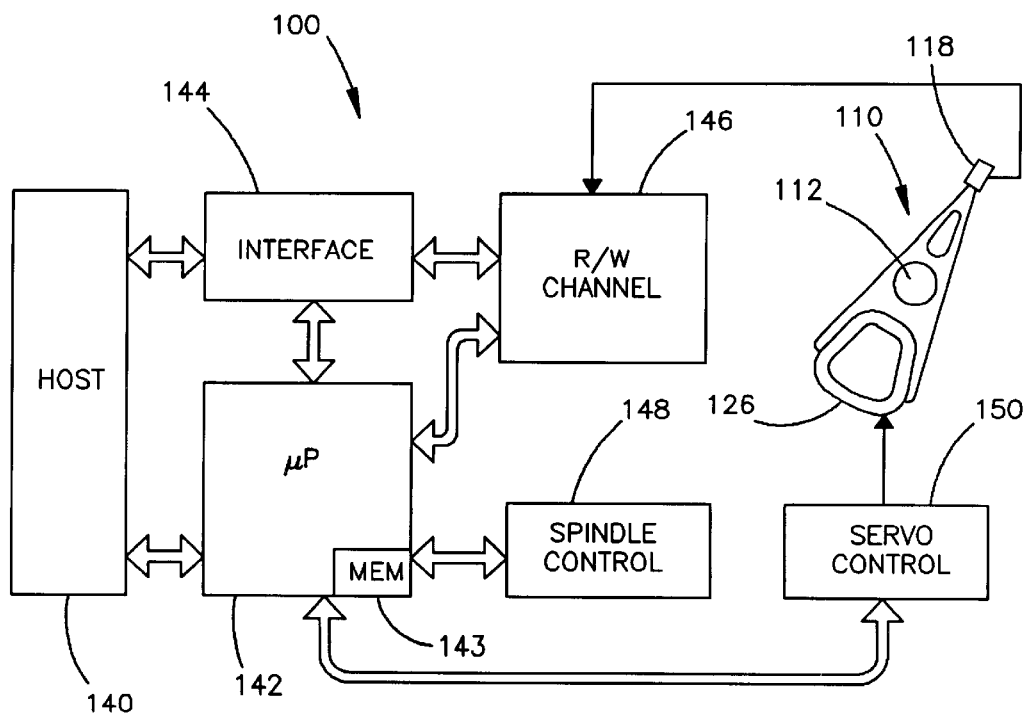
FIG. 2 illustrates a disc drive system connected to a host for the disc drive of FIG. 1.

The discussions with respect to FIGS. 1 and 2 are intended primarily to familiarize the reader with a disc drive generally. The discussion with respect to FIG. 3 relates to the insight underlying the present invention. Finally, the discussion relating to FIGS. 4 and 5 relate to exemplary embodiments of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114.

Mounted at the distal end of each of the flexures 116 is a head 118 which includes an air bearing slider enabling the head 118 to fly in close proximity above the corresponding surface of the associated disc 108. As discussed earlier, an air current created by the rotation of the disc 108 interacts with the air-bearing surface to provide the lifting force that permits the head 118 to float. Because the velocity of the disc 108 is greater at the outer diameter than at the inner diameter, a greater air current is generated over regions of the disc located toward the outer diameter, and the head 118 typically floats at a higher elevation than it does when it is located toward the inner diameter.

The position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex connector 134 for communication through the base deck 102 to a disc drive printed circuit board (not shown) mounted to the bottom side of the disc drive 100. The connector 134 is held by a bracket to the bottom side of the disc drive 100.

The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a channel 146, which encodes and serializes the data and provides the requisite write current signals to the heads 118. To retrieve data that has been previously stored by the disc drive 100, read signals are generated by the heads 118 and provided to the channel 146, which performs equalization, decoding, error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
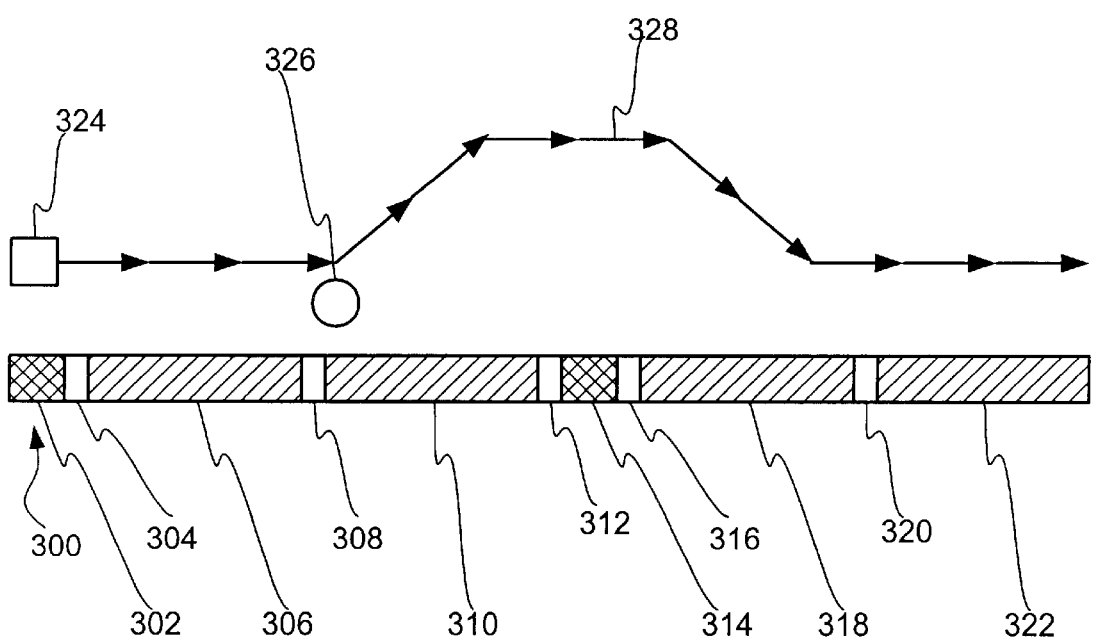
FIG. 3 depicts a head traveling over a linearized portion of a track.

FIG. 3 depicts a head 324 traveling over a linearized portion of a track 300 at nominal fly height. The path of the head is depicted by trajectory line 328. The linearized track 300 is shown in profile and has a structure characterized by each servo sector 302 and 314 being followed by two data sectors 306, 310, 318, 322. Small gaps 304, 308, 312, 316, 320 separate each of the sectors 302, 306, 310, 314, 318, 322. As can be seen from FIG. 3, the head 324 typically floats at a low elevation as it travels over the disc. However, interaction with a contaminant particle 326 may cause the head 324 to momentarily soar to a greater elevation before returning to its ordinary elevation. For example, in the scenario presented in FIG. 3, as the head 324 nears the edge of data sector 306, it encounters the particle 326 and soars at an abnormally elevated height over data sector 310 and servo sector 314. If this event were to have occurred during the course of executing a write command, the data written in data sector 310 would have been recorded with abnormally weak magnetic intensity, because the head 324 would not have been as close to the disc as anticipated by the recording circuitry. Thus, FIG. 3 depicts a low-amplitude-write/skip-write event.

Figure 4:
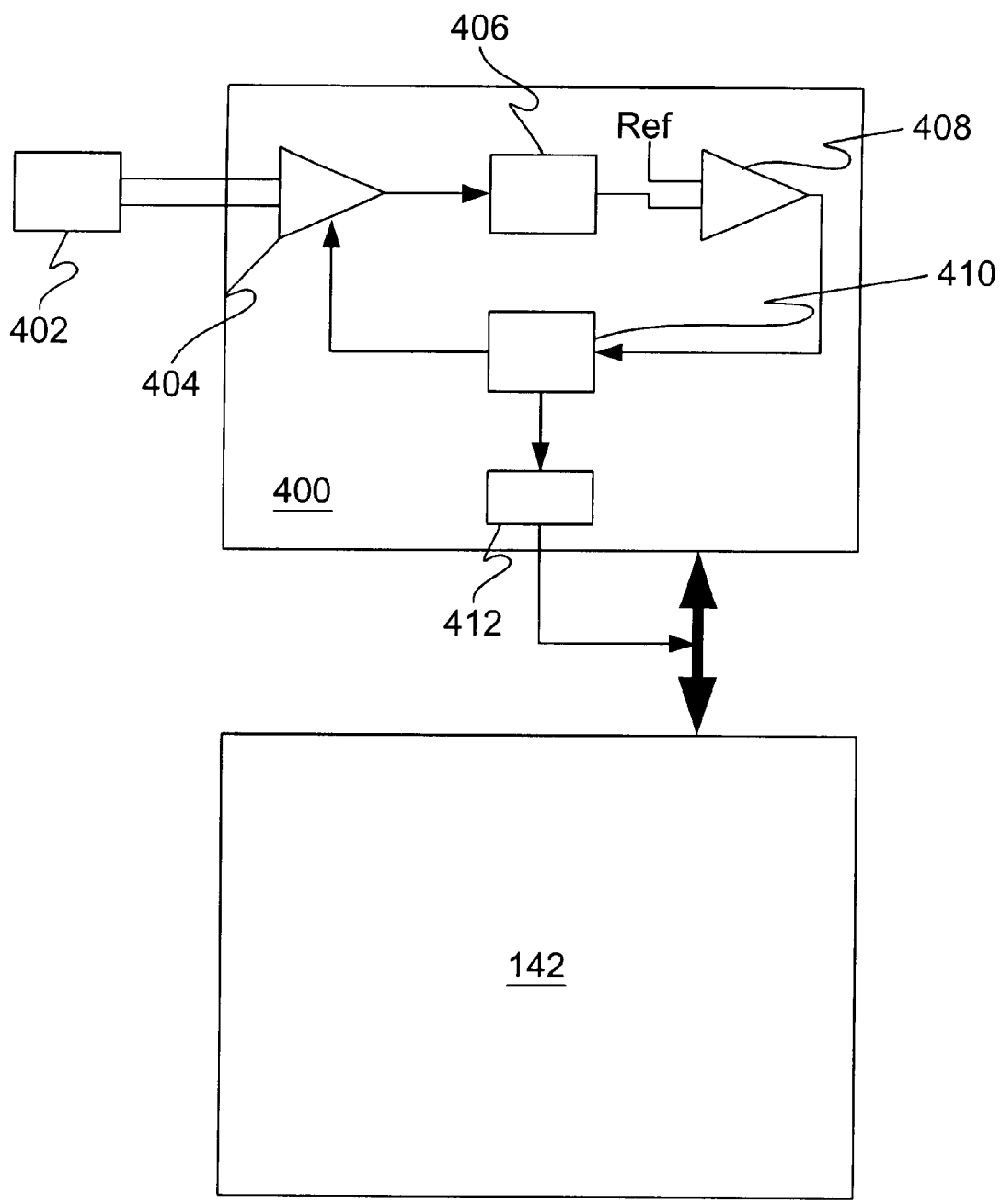
FIG. 4 depicts the microprocessor within the disc drive and a read channel application specific integrated circuit, in accordance with one embodiment of the invention.

FIG. 4 depicts a microprocessor 142 within a disc drive and a read channel application specific integrated circuit (ASIC) 400, which is a constituent of a read channel 148 (depicted in FIG. 1). As can be seen from FIG. 4, a head 402 is coupled, either directly or indirectly, to a variable gain amplifier 404. During execution of a read operation, the read signal is communicated from the head 402 to the variable gain amplifier 404. The gain factor of the variable gain amplifier 404 is determined by a control signal that is generated by a gain controller 410. The gain factor of the variable gain amplifier 404 is controlled so that its output is of approximately constant amplitude. The output of the variable gain amplifier 404 is then fed to a waveform equalizer 406, which frequency-space filters the signal. The waveform equalizer 406 may consist of both an analog stage and a digital stage. Although not shown, the output of the waveform equalizer 406 is provided to the remaining stages of recovery circuitry, so that the signal detected from the disc may be resolved into data and ultimately provided to the host microprocessor. The output of the waveform equalizer 406 is additionally supplied to an amplitude comparator 408, which compares the amplitude of the equalized signal against a reference signal of known amplitude, and yields an output signal with a characteristic (such as duty cycle, frequency or amplitude) that varies approximately linearly with the difference between its two inputs. The output of the amplitude comparator 408 is supplied to the gain controller 410, which, as mentioned earlier, controls the gain factor of the variable gain amplifier 404 so that its output is of approximately constant amplitude. The gain controller 410 performs the function of an analog-to-digital convertor, producing a digital value as its output. Accordingly, the output of the gain controller 410 is readable by the microprocessor 142, as well as by the variable gain amplifier 404.

As described earlier, because the velocity of the disc 108 is greater at the outer diameter than at the inner diameter, a greater air current is generated over regions of the disc located toward the outer diameter. Therefore, the head 402 typically floats at a higher elevation at the outer diameter of the disc than it does when it is located toward the inner diameter. Consequently, the variable gain amplifier 404 tends to employ a greater gain factor when the head is located over regions of the disc toward the outer diameter and $_{vice\ versa}$. To account for the range of gain factors to be employed by the variable gain amplifier 404, the gain controller 410 may be calibrated so that the midpoint of its range of outputted control signals corresponds to the gain factor to be employed by the variable gain amplifier 404 when the head 402 is half-way between the inner and outer diameter of the disc 108.

During execution of a read or a write command, the read channel ASIC 400 and the microprocessor 142 of the disc drive are in communication. The read channel ASIC 400 transfers servo data to the microprocessor 142, for the purpose of permitting the microprocessor 142 to ensure that the head 402 is on a proper course while reading or writing is taking place. The read channel ASIC 400 communicates to the microprocessor 142 a data structure that contains, among other information, servo data (read from a servo sector) and the value of the control signal used by the variable gain amplifier 404 while it acquired the servo data from the servo sector. The control signal value may be stored in a register 412 for delivery to the microprocessor and/or the variable gain amplifier 404

The variable gain amplifier 404, the waveform equalizer 406, the amplitude comparator 408, the gain controller 410, and the register 412 may be wholly or partially implemented as discrete circuitry components, as subcircuits of an ASIC, or as firmware running on a microprocessor.

Returning to a discussion of FIG. 3 in light of FIG. 4, it can be reasoned from previous discussion that as the head 324 passes over the servo sector 314 at the depicted abnormally high elevation, the variable gain amplifier 404 is controlled by the gain controller 410 so as to use a relatively high gain factor. The relatively high gain factor compensates for the fact that the read head 324 is relatively far from the disc, meaning that the signal yielded by the read head 324 is weak, thereby requiring greater amplification. The microprocessor 142, which receives the servo data from the servo sector 314 also receives the control signal used by the variable gain amplifier 404 while it acquired the servo data from the servo sector 314. Thus, by observing the relatively high control signal, the microprocessor 142 is able to determine that a low-amplitude-write/skip-write event occurred.

One skilled in the art recognizes that any signal along the feedback loop created by the amplitude comparator 408 and the gain controller 410 may be used as a proxy for determining fly height. The outputs of the amplitude comparator 408 and the gain controller 410 are "read-back control signals." A read-back control signal is a signal that contains information proportional to the strength of the signal read by the disc drive. The gain value employed by the variable gain amplifier 404, for example, is a read-back control signal. Alternatively, the read signal itself, or a time-averaged amplitude thereof, may be a read-back control signal. A read-back control signal may be used in accordance with the methods and apparatuses described herein for the purpose of identifying a write irregularity.

To briefly state the low-amplitude-write/skip-write detection strategy, a disc drive first determines the gain factor expected to be used by the variable gain amplifiers as the head 402 passes over servo sectors along a given track at nominal flying height. The gain factor is a proxy measurement of elevation of the head 402. Then, after execution of a write command, the disc drive examines the gain factor employed by the variable gain amplifier 404 as the head 402 passes over the very next servo sector. The assumption employed in so doing is that if the head 402 was soaring at an abnormal elevation while writing data to a data sector, the head 402 will still be soaring at an abnormal elevation as it passes over the very next servo sector. Thus, if the disc drive determines that an abnormally high gain factor was employed by the variable gain amplifier 404 while reading the very next servo sector, the disc drive can know that a low-amplitude-write/skip-write event occurred.

Figure 5:
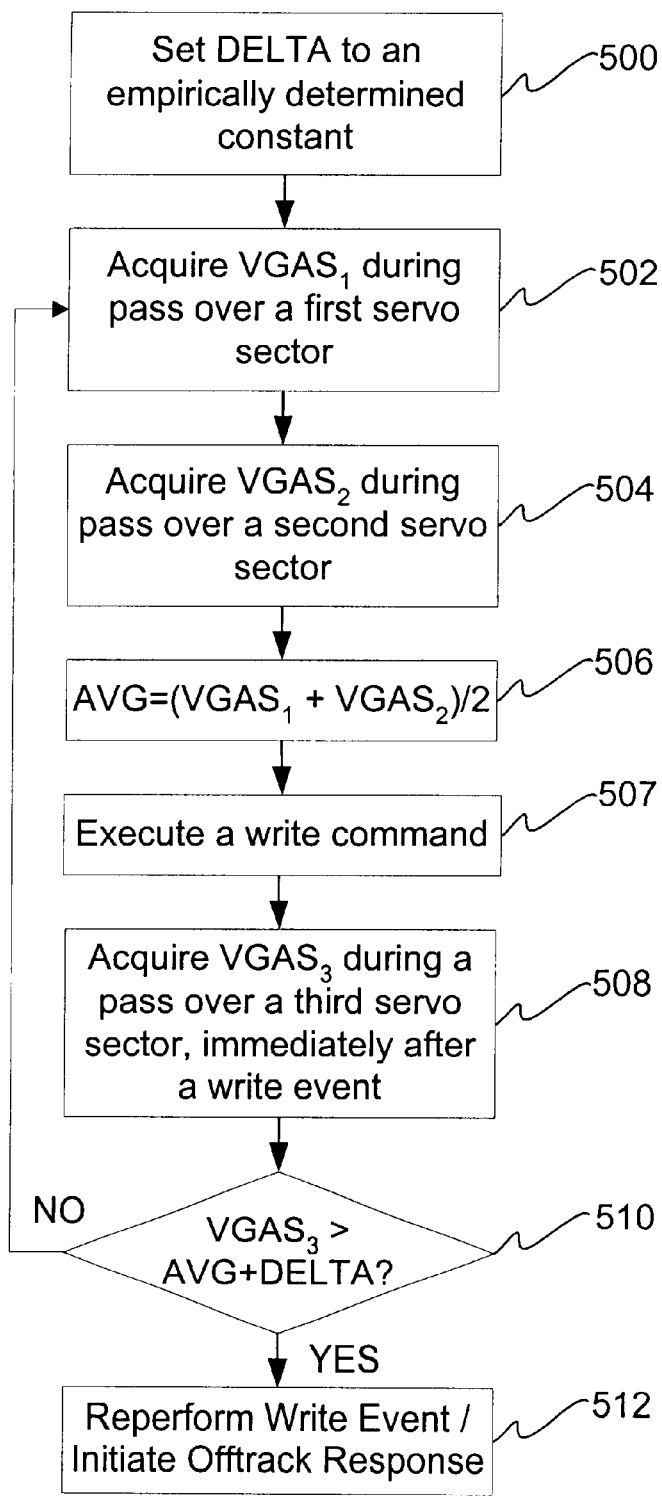
FIG. 5 depicts a sequence of acts that may be executed by the microprocessor within the disc drive, to both detect and react to a low-amplitude-write/skip-write event.

FIG. 5 depicts a sequence of acts that may be executed by the microprocessor 142 within the disc drive, to both detect and react to a low-amplitude-write/skip-write event. As can be seen from FIG. 5, the method begins with operation 500, in which a DELTA value is set to an empirically determined constant. The DELTA value is a numerical quantity, which defines the amount by which the control signal may deviate from an expected value of the control signal without indicating the occurrence of a low-amplitude-write/skip-write event. Stated another way, if the control signal deviates from the expected value of the control signal by more than the DELTA value, a low-amplitude-write/skip-write event is indicated. Next, in operations 502 and 504 control signal values used to control the variable gain amplifier during reading of two servo sectors prior to the execution of a write command are acquired (these two control signal values are referred to as $VGAS_1$ and $VGAS_2$). Next, in operation 506, the average of the two control signal values is found. This average represents the expected value of the control signal value, the value that should be returned if the head passes over a servo sector at its typical elevation. In operation 507, the write command is executed. After writing to one or more data sectors immediately preceding a servo sector, data from the servo sector is acquired (in operation 508), including the control signal value used to control the variable gain amplifier during reading of the servo sector. Next, in query operation 510, the control signal value acquired in operation 508 is checked to see if it exceeds the average determined in operation 506 by more than the DELTA value determined in operation 500. If this inquiry is negative, a low-amplitude-write/skip-write event has not occurred, and control is returned to operation 502. If, on the other hand, this inquiry is affirmative, then a low-amplitude-write/skip-write event is determined to have occurred, and control is passed to operation 512, where the user data is rewritten to the data sectors preceding the servo sector. In an alternate embodiment, operation 512 comprises the set of operations ordinarily used to deal with an off-track write event (i.e., the disc drive will respond to a low-amplitude-write/skip-write event in the same manner as it responds when it determines that it has written user data off-track). For example, operation 512 may include calling an off-track correction function.

In one embodiment of the invention, the above-described method is designed so that the disc drive does not declare the occurrence of a low-amplitude-write/skip-write event, unless it determines that it will likely have to employ one or more read re-try algorithms when reading the data in the future. This is accomplished by setting the DELTA value to an empirically determined value. Thus, for a disc drive, it may be experimentally determined that a particular difference in magnetic intensity of consecutive sectors is likely to result in the detection circuitry being unable to read the data without employing read re-try algorithms. The DELTA value may be set to correspond with that empirically determined value.

In summary, a method for detecting and responding to a low-amplitude write/skip-write event may be executed by characterizing the gain of a variable gain amplifier embedded in the read path during at least two instances in which the read head passes over a servo sector, prior to a write event (such as in operations 502, 504, and 506). Next the write event is executed (such as in operation 507). After the write event, the gain factor employed by the variable gain amplifier is acquired as the read head passes over the following servo sector. Finally, the acquired gain factor is compared to the sum of the characterization in order to detect a low-amplitude-write/skip-write event (such as in operation 510).

The process of characterizing the at least two instances in which the read head passed over a servo sector prior to the write event may involve storing a first gain factor employed by the variable gain amplifier as the read head passes over a first servo sector (such as in operation 502). Additionally, a second gain factor employed by the variable gain amplifier as the read head passes over a second servo sector is stored (such as in operation 504). Finally, the two stored gain factors are averaged (such as in operation 506).

The process of comparing the acquired gain factor to the characterization may involve finding the difference between the acquired gain factor and the average of the two stored gain factors (such as in operation 510). Upon finding that the difference exceeds a threshold quantity (a DELTA value), a low-amplitude-write/skip-write event is declared (such as in operation 510). In one embodiment, the aforementioned threshold quantity is determined to correspond to a magnitude of change in magnetic intensity of data written during the write event, such that upon an attempt of reading the data written during the write event, one or more read retry algorithms would likely have to be initiated.

Responding to the occurrence of a low-amplitude-write/skip-write event may involve reperforming the write event (such as in operation 512). Alternatively, a response may involve behaving as though the write event had been determined to be off-track (such as in operation 512).

A disc drive may be configured and arranged to detect a low-amplitude-write/skip-write event. A disc drive so configured may include a disc (such as 108) for magnetically storing data. A read head (such as 118 or 402) is used to read data from the disc (such as 108). A variable gain amplifier (such as 404) is operably coupled to the read head (such as 118 or 402); the variable gain amplifier (such as 404) receives a signal from the read head (such as 118 or 402) and outputs a signal of approximately constant amplitude. The gain of the variable gain amplifier (such as 404) is controlled by a control signal generated by a gain controller (such as 410). Finally, a microprocessor (such as 142) is operably coupled to the gain controller (such as 410), such that the microprocessor (such as 142) has access to a digital representation of the control signal. The microprocessor (such as 142) is programmed to carry out the steps summarized in the above passages.

According to another embodiment of the invention, a disc drive may be configured and arranged to detect a low-amplitude-write/skip-write event. A disc drive so configured may include a disc (such as 108) for magnetically storing data and a means for detecting a low-amplitude-write/skip-write event (such as 404, 410, and 142). Optionally, this embodiment of the invention may include a means for responding to a low-amplitude-write/skip-write event (such as 142). The means for responding may include a means for reperforming the write event (such as 142). Alternatively, the means for responding may include a means for behaving in the same manner as if the write event had been determined to be off-track (such as 142).

The means for detecting the low-amplitude-write/skip-write event may include a means for determining how far above the disc a read head (such as 118 or 402) usually is as the read head passes over a servo sector (such as 404,410, and 142). Additionally, it may include a means for determining how far above the disc the read head (such as 118 or 402) is as the read head passes over a servo sector immediately following a write event (such as 404, 410, and 142). Finally, it may include a means for comparing how far above the disc the read head was when the read head passed over a servo sector immediately following the write event with how far above the disc the read head usually is as the read head passes over a servo sector (such as 142).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, a statistical measure other than an average (such as a median or a weighted average) may be used to arrive at an expected value of a control signal value used during reading of a servo sector. Additionally, a set of more than two previous control signal values may be characterized for the purpose of determining the expected value of the control signal. Numerous other changes may be made which will readily suggest themselves to those skilled in the art and which are encompassed in the spirit of the invention disclosed and as defined in the appended claims.

What is claimed is:

1. A method of detecting write irregularities in a disc drive having a disc with one or more data sectors situated between consecutive servo sectors, and having a variable gain amplifier receiving a signal from a read head, a gain of the variable gain amplifier being controlled by a control signal, the method comprising steps of:

characterizing the control signal during at least two instances during which the read head passes over a servo sector, prior to a write event;

executing the write event;

acquiring the control signal as the read head passes over an immediately following servo sector, after the write event; and comparing the acquired control signal to the characterization of the control signal in order to detect a write irregularity.

2. The method of claim 1, wherein the characterizing step comprises:

storing a first digital representation of the control signal as the read head passes over a first servo sector;

storing a second digital representation of the control signal as the read head passes over a second servo sector; and obtaining an average of the first and second stored representations of the control signal.

3. The method of claim 2, wherein the comparing step comprises:

finding the difference between the acquired control signal and the average of the first and second stored representations of the control signal;

comparing the difference against a threshold; and declaring that a write irregularity has occurred, if the difference exceeds the threshold.

4. The method of claim 3, wherein the threshold corresponds to a change in magnetic intensity of recorded data, invoking one or more read retry algorithms.

5. The method of claim 4, wherein the method further comprises a step of:

reperforming the write event, if the write irregularity has occurred.

6. A method of detecting write irregularities in a disc drive having a disc with one or more data sectors situated between consecutive servo sectors, and having a variable gain amplifier receiving a signal from a read head, a gain of the variable gain amplifier being controlled by a control signal, the method comprising steps of:

storing a first digital representation of the control signal as the read head passes over a first servo sector;

storing a second digital representation of the control signal as the read head passes over a second servo sector; and obtaining an average of the first and second stored representations of the control signal;

executing the write event;

acquiring the control signal as the read head passes over a following servo sector, after the write event; and finding the difference between the acquired control signal and the average of the first and second stored representations of the control signal;

comparing the difference against a threshold;

declaring that a write irregularity has occurred, if the difference exceeds the threshold; and calling an off-track correction function, if the write irregularity event has occurred.

7. The method of claim 1, wherein the comparing step comprises:

finding the difference between the acquired control signal and the characterization of the control signal;

comparing the difference against a threshold; and declaring that a write irregularity has occurred, if the difference exceeds the threshold.

8. The method of claim 7, wherein the threshold corresponds to a of change in magnetic intensity of recorded data, invoking one or more read retry algorithms.

9. The method of claim 1, wherein the method further comprises a step of:

reperforming the write event, if the write irregularity has occurred.

10. A method of detecting write irregularities in a disc drive having a disc with one or more data sectors situated between consecutive servo sectors, and having a variable gain amplifier receiving a signal from a read head, a gain of the variable gain amplifier being controlled by a control signal, the method comprising steps of:

characterizing the control signal during at least two instances during which the read head passes over a servo sector, prior to a write event;

executing the write event;

acquiring the control signal as the read head passes over a following servo sector, after the write event;

comparing the acquired control signal to the characterization of the control signal in order to detect a write irregularity; and calling an off-track correction function, if the write irregularity has occurred.

11. A disc drive comprising:

a disc for magnetically storing data in one or more data sectors situated between consecutive servo sectors;

a read head for reading data from the disc;

a variable gain amplifier operably coupled to the read head for receiving a signal from the read head, the gain of the variable gain amplifier being controlled by a control signal;

a gain controller operably coupled to the variable gain amplifier for generating the control signal;

a microprocessor operably coupled to the gain controller, the microprocessor having access to a digital representation of the control signal, the microprocessor being programmed to characterize the control signal during at least two instances during which the read head passes over a servo sector;

execute a write event;

acquire the control signal as the read head passes over an immediately following servo sector, after the write event; and compare the acquired control signal to the characterization of the control signal in order to detect a write irregularity.

12. The disc drive of claim 11, wherein the microprocessor is programmed to characterize the control signal by:

storing a first digital representation of the control signal as the read head passes over a first servo sector;

storing a second digital representation of the control signal as the read head passes over a second servo sector; and obtaining an average of the first and second stored representations of the control signal.

13. The disc drive of claim 11, wherein the microprocessor is programmed to compare the acquired control signal to the characterization of the control signal by:

finding a difference between the acquired control signal and an average of a first and second stored representation of the control signal;

comparing the difference against a threshold; and declaring that a write irregularity has occurred, if the difference exceeds the threshold.

14. The disc drive of claim 13, wherein the microprocessor is further programmed to:

reperform the write event, if the write irregularity has occurred.

15. A disc drive comprising:

a disc for magnetically storing data in one or more data sectors situated between consecutive servo sectors, a read head for reading data from the disc;

a variable gain amplifier operably coupled to the read head for receiving a signal from the read head, the gain of the variable gain amplifier being controlled by a control signal;

a gain controller operably coupled to the variable gain amplifier for generating the control signal;

a microprocessor operably coupled to the gain controller, the microprocessor having access to a digital representation of the control signal, the microprocessor being programmed to:

characterize the control signal during at least two instances during which the read head passes over a servo sector by storing a first digital representation of the control signal as the read head passes over a first servo sector, storing a second digital representation of the control signal as the read head passes over a second servo sector, and obtaining an average of the first and second stored representations of the control signal;

execute a write event;

acquire the control signal as the read head passes over the following servo sector, after the write event; and compare the acquired control signal to the characterization of the control signal in order to detect a write irregularity by finding a difference between the acquired control signal and an average of a first and second stored representation of the control signal, comparing the difference against a threshold, and declaring that a write irregularity has occurred, if the difference exceeds the threshold; and call an off-track correction function, if the write irregularity has occurred.

16. A disc drive comprising:

a disc for magnetically storing data in one or more data sectors between consecutive servo sectors; and a means for determining a nominal distance between a read head and a disc surface, as the read head passes over a servo sector;

a means for determining a fly height between the read head and the disc surface, as the read head passes over a servo sector immediately following a write event; and a means for comparing the nominal distance and the fly height.

17. The disc drive of claim 16, further comprising a means for responding to a write irregularity.

18. The disc drive of claim 17, wherein the means for responding to a write irregularity comprises a means for reperforming the write event.

19. The disc drive of claim 17, wherein the means for responding includes a means for calling an off-track correction function.

* * * * *